(12) United States Patent
Pechtold

(10) Patent No.: US 7,341,074 B2
(45) Date of Patent: Mar. 11, 2008

(54) MULTI-STAGE PRESSURE REGULATOR

(75) Inventor: Rainer Pechtold, Russelsheim (DE)

(73) Assignee: GM Global Technology Operations, Inc., Detroit, MI (US)

( * ) Notice: Subject to any disclaimer, the term of this patent is extended or adjusted under 35 U.S.C. 154(b) by 280 days.

(21) Appl. No.: 11/132,982

(22) Filed: May 19, 2005

(65) Prior Publication Data

US 2006/0260692 A1     Nov. 23, 2006

(51) Int. Cl.
    *G05D 16/06* (2006.01)
(52) U.S. Cl. .................. 137/505.42; 137/505.46; 137/599.09; 137/601.01; 137/601.12
(58) Field of Classification Search .......... 137/505, 137/505.46, 599.07, 599.09, 601.01, 601.12, 137/505.42
    See application file for complete search history.

(56) References Cited

U.S. PATENT DOCUMENTS

| | | | | |
|---|---|---|---|---|
| 188,740 A | * | 3/1877 | Kipp et al. ................. | 137/505 |
| 853,693 A | * | 5/1907 | Healey ................... | 137/505.13 |
| 1,706,230 A | * | 3/1929 | Hilger ........................ | 137/505 |
| 2,601,745 A | * | 7/1952 | Cruzan ................... | 137/505.38 |
| 3,742,972 A | * | 7/1973 | Hughes ....................... | 137/110 |
| 5,048,564 A | * | 9/1991 | Gaiardo ................. | 137/599.07 |
| 5,158,107 A | * | 10/1992 | Teay ..................... | 137/505.46 |
| 5,944,257 A | * | 8/1999 | Dietiker et al. ........ | 137/599.09 |

* cited by examiner

*Primary Examiner*—Stephen M. Hepperle

(57) ABSTRACT

A pressure regulator that has particular application for an anode input side of a fuel cell system to provide the desired large turn-down ratio. The pressure regulator includes at least two valves positioned in parallel where the first valve is smaller than the second valve. The first valve is opened and closed and the second valve is maintained closed at low flow rates. Once the flow rate is high enough, the first valve is maintained completely open, and the second valve is opened and closed to control the flow at high flow rates.

14 Claims, 3 Drawing Sheets

MULTI-STAGE PRESSURE REGULATOR

BACKGROUND OF THE INVENTION

1. Field of the Invention

This invention relates generally to a pressure regulator and, more particularly, to a pressure regulator that includes multiple valve stages to increase the turn-down ratio of the regulator.

2. Discussion of the Related Art

Hydrogen is a very attractive fuel because it is clean and can be used to efficiently produce electricity in a fuel cell. The automotive industry expends significant resources in the development of hydrogen fuel cells as a source of power for vehicles. Such vehicles would be more efficient and generate fewer emissions than today's vehicles employing internal combustion engines.

A hydrogen fuel cell is an electrochemical device that includes an anode and a cathode with an electrolyte therebetween. The anode receives hydrogen gas and the cathode receives oxygen or air. The hydrogen gas is dissociated in the anode to generate free protons and electrons. The protons pass through the electrolyte to the cathode. The protons react with the oxygen and the electrons in the cathode to generate water. The electrons from the anode cannot pass through the electrolyte, and thus are directed through a load to perform work before being sent to the cathode. The work acts to operate the vehicle.

Several fuel cells are typically combined in a fuel cell stack to generate the desired power. For the automotive fuel cell stack mentioned above, the stack may include about two hundred or more cells. The fuel cell stack receives a cathode reactant gas, typically a flow of air forced through the stack by a compressor. Not all of the oxygen is consumed by the stack and some of the air is output as a cathode exhaust gas that may include water as a stack by-product. The fuel cell stack also receives an anode hydrogen reactant gas that flows into the anode side of the stack.

Flow control pressure regulators are employed in fuel cell systems at various locations to provide a desired gas flow rate. For example, pressure regulators are typically employed at the anode side of the fuel cell stack to provide a pressure reduction of the hydrogen gas flow from a hydrogen pressure storage tank and at an anode inlet to the stack. At the output of the hydrogen pressure tank, the pressure regulator may be required to reduce the pressure from 30-700 bar tank pressure to 4-9 bar line pressure. At the input to the anode side of the fuel cell stack, the pressure reduction may be from 4-9 bar line pressure to 1-2 bar stack pressure. In both of these applications, the hydrogen flow rate may vary between 0.02 and 2.0 g/s. These parameters provide a regulator turn-down ratio, i.e., range of operation, of about 1:100. However, known pressure regulators are generally designed for turn-down ratios in the range of 1:10-1:20, and typically require a relatively constant inlet pressure. These types of pressure regulators are not suitable for fuel cell system applications because of the accurate pressure regulation of low flow rates, and the tight flow control necessary for the anode input.

Pressure regulation in a flow control pressure regulator is usually provided electronically using proportional valves or injectors. Alternately, a passive control can be used where the pressure regulator is responsive to a reference pressure, such as the cathode input pressure. FIG. 1 is a cross-sectional view of a pressure regulator 10 of this type. The pressure regulator 10 includes a regulator body 12 defining the various ports, chambers, orifices, etc. in the regulator 10.

The gas flow is introduced at an inlet port 14 and exits the regulator 10 at an outlet port 16. The gas from the inlet port 14 flows through a valve chamber 18, then through an orifice 20 and into a chamber 22 in fluid communication with the outlet port 16.

The flow of the gas from the inlet port 14 to the outlet port 16 is controlled by a valve 28 positioned within the valve chamber 18. The valve 28 includes a valve head 30, a valve body 32 and a valve spring 34 wound around the valve body 32. The valve spring 34 applies a bias against the valve head 30 as set by a positioning element 26 threaded into the valve chamber 18. The valve head 30 seats against a tapered valve seat 36 to close the orifice 20. In other valve designs, the valve seat 36 may not be tapered. A shaft 38 is rigidly coupled to the head 30 and a cylindrical member 40 that is part of a membrane assembly 42. The membrane assembly 42 includes a support structure 44 having a central bore 46 in which the cylindrical member 40 is rigidly mounted. The membrane assembly 42 also includes a pair of membranes 48 and 50 mounted to opposing sides of the support structure 44 and the valve body 12, as shown, where the chamber 22 is below the membrane 50. In a hydrogen environment, it is necessary that the hydrogen be tightly contained within the proper chambers and flow channels. For this reason, the membrane assembly 42 includes the dual membranes 48 and 50. If the membrane 50 leaks hydrogen, then this leak can be detected at port 66 before it then leaks through the membrane 48 and into the air side of the regulator 10.

A spring 54 is positioned within a spring chamber 56 in contact with the support structure 44 at one end and a positioning screw 58 at an opposite end. A reference port 60 is in fluid communication with the chamber 56. The reference port 60 is coupled to a reference pressure for the particular application. The reference pressure may be ambient for the tank pressure regulator, or may be coupled to the cathode input pressure for the anode input pressure regulator. The bias of the springs 34 and 54 are calibrated by adjusting the screw 58 so that the pressure applied to the membrane assembly 42 against the bias of the springs 34 and 54 in combination with the reference pressure positions the membrane assembly 42 at a desired location relative to the chamber 22.

When a greater hydrogen flow rate demand is desired, such as for an increased load from a fuel cell stack (not shown), the stack will draw more hydrogen fuel, which will decrease the pressure at the outlet port 16. This decrease in pressure is transferred to the chamber 22, which causes the membrane assembly 42 to move downward with the bias of the spring 54 and against the bias of the spring 34. As the valve-body 32 moves down into a bore 68 in the positioning element 26, the head 30 moves farther away the valve seat 36, where the configuration of the valve seat 36 causes more hydrogen to flow from the inlet port 14 providing the increased flow rate. As the hydrogen demand decreases, the pressure at the outlet port 16 will increase, and the membrane assembly 42 will move up against the bias of the spring 54 and move the head 30 closer to the valve seat 36 to reduce the flow rate in the same manner.

Because the size of the orifice 20 at the valve seat 26 is fixed, the flow rate between a fully closed position and a fully opened position of the valve 28 is also fixed. It is for this reason that the pressure regulator 10 has a low turn-down ratio. When the pressure regulator is designed, the size of the orifice 20 is selected to provide the maximum flow that will be demanded. However, this provides less flow sensitivity at low flow rates because as the valve head 30 moves away from the valve seat 36, the size of the orifice 20 would be too large for low flow control, possibly causing the valve 28 to oscillate.

SUMMARY OF THE INVENTION

In accordance with the teachings of the present invention, a pressure regulator is disclosed that has particular application for an anode input side of a fuel cell system to provide the desired large turn-down ratio. The pressure regulator includes at least two valves positioned in parallel where the first valve is smaller than the second valve. The first valve is opened and closed and the second valve is maintained closed at low flow rates. Once the flow rate is high enough, the first valve is maintained completely open, and the second valve is opened and closed to control the flow at high flow rates.

Additional advantages and features of the present invention will become apparent from the following description and appended claims, taken in conjunction with the accompanying drawings.

DETAILED DESCRIPTION OF THE EMBODIMENTS

The following discussion of the embodiments of the invention directed to a multi-stage pressure regulator is merely exemplary in nature, and is in no way intended to limit the invention or its applications or uses. Particularly, the multi-stage pressure regulator of the invention has particular application for an anode side of a fuel cell system. However, as will be appreciated by those skilled in the art, the pressure regulator of the invention may have other applications.

Figure 1:
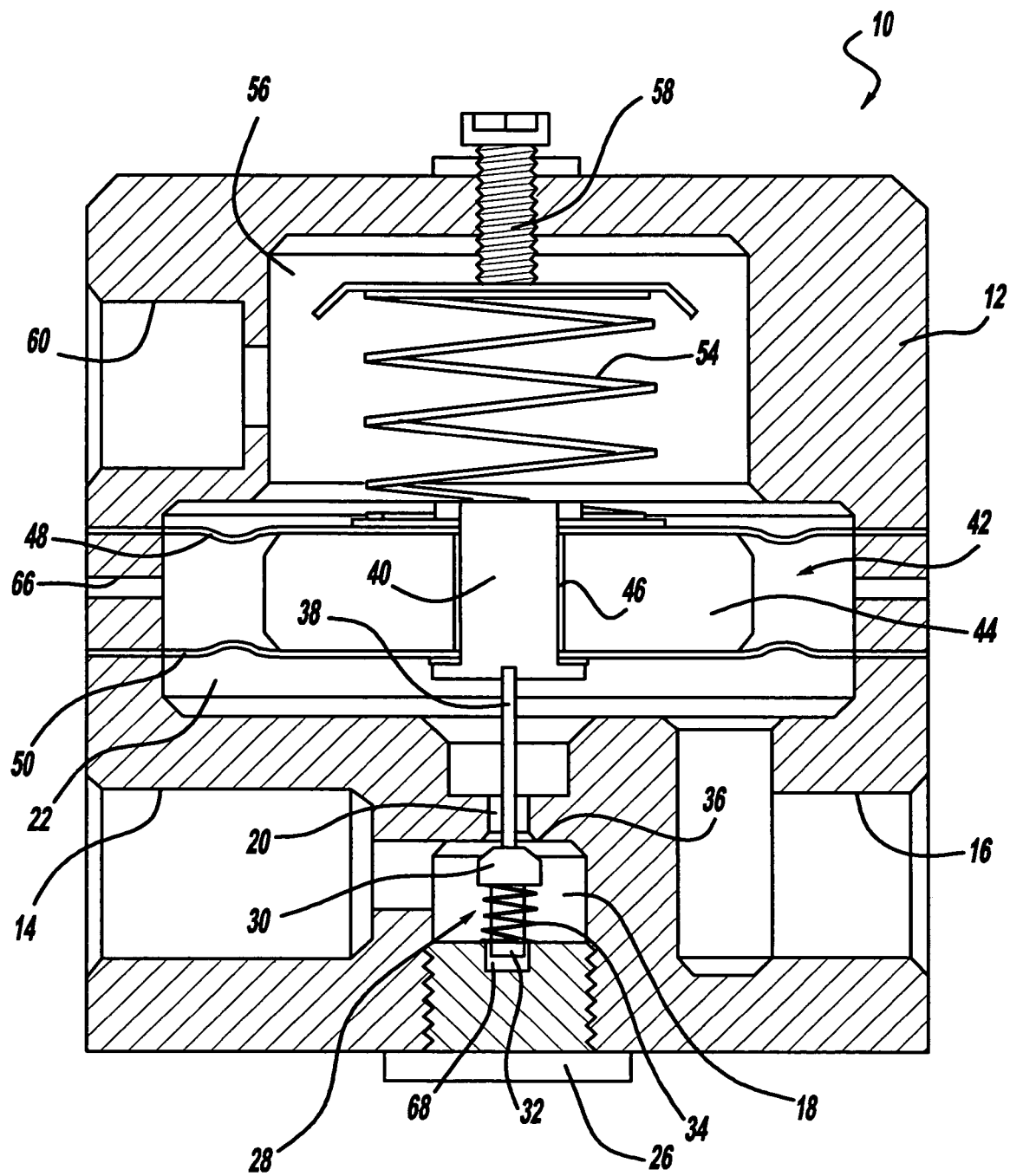
FIG. 1 is a cross-sectional view of a known flow control pressure regulator.
Figure 2:
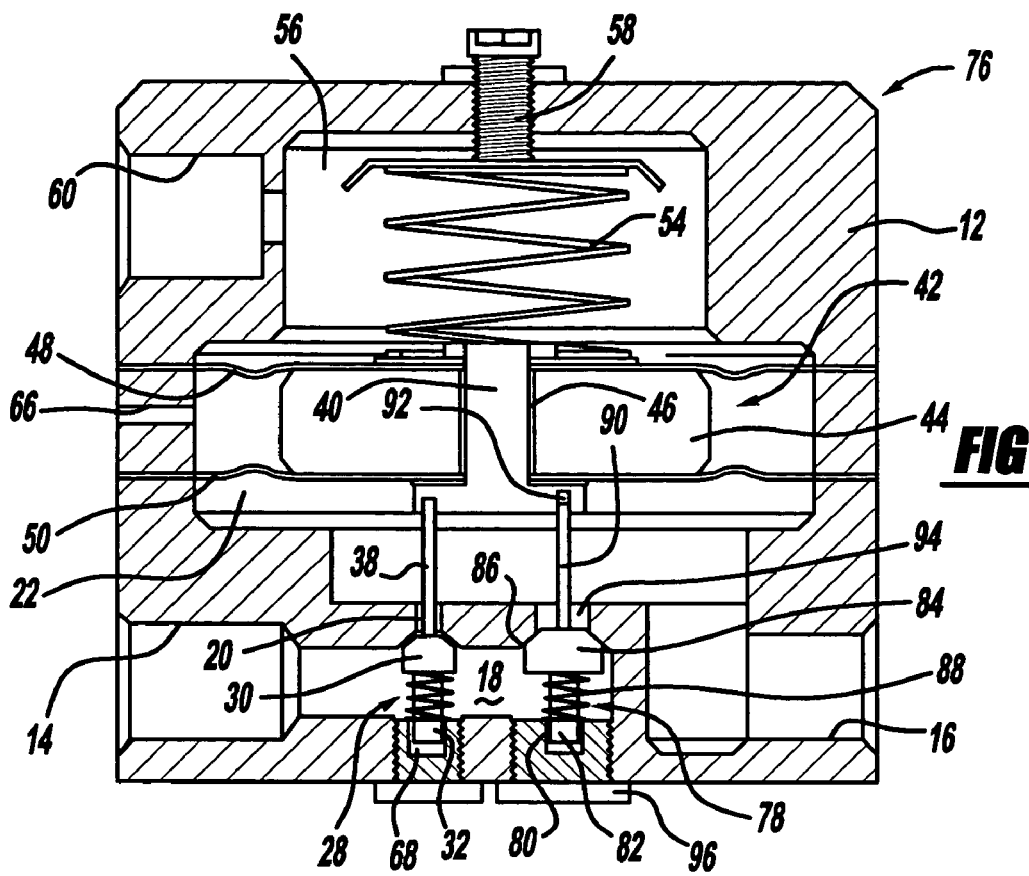
FIG. 2 is a cross-sectional view of a flow control pressure regulator including two valves, according to an embodiment of the present invention.

FIG. 2 is a cross-sectional view of a flow control pressure regulator 76 that has particular application for the anode side of a fuel cell system, as discussed above, according to an embodiment of the present invention, where like elements are identified by the same reference numeral as the pressure regulator 10. The pressure regulator 76 provides greater flow control at low flow rates for a larger turn-down ratio than the pressure regulator 10. In the pressure regulator 76, the valve 28 is sized and configured to provide the desired flow control at low gas flow rates.

A second valve 78 is positioned in the valve chamber 18 in parallel with the valve 28 and provides flow control at high gas flow rates when the valve 28 is completely opened to provide the large turn-down ratio. The valve 78 is similar to the valve 28 but has a larger size. The valve 78 includes a valve body 82 slidably positioned within a bore 80 in a threaded positioning device 96 and a valve head 84 that seats against a valve seat 86 formed in the body 12. The valve seat 86 is tapered in this embodiment. However, the valve seat 86 may not be tapered in other embodiments. A valve spring 88 controls the force of the valve head 84 against the valve seat 86 and helps control the position of the membrane assembly 42, as discussed above for the valve 28. The valve head 84 closes an orifice 94 between the valve chamber 18 and the chamber 22 below the membrane 50, where the orifice 94 has a larger diameter than the orifice 20.

Figure 3:
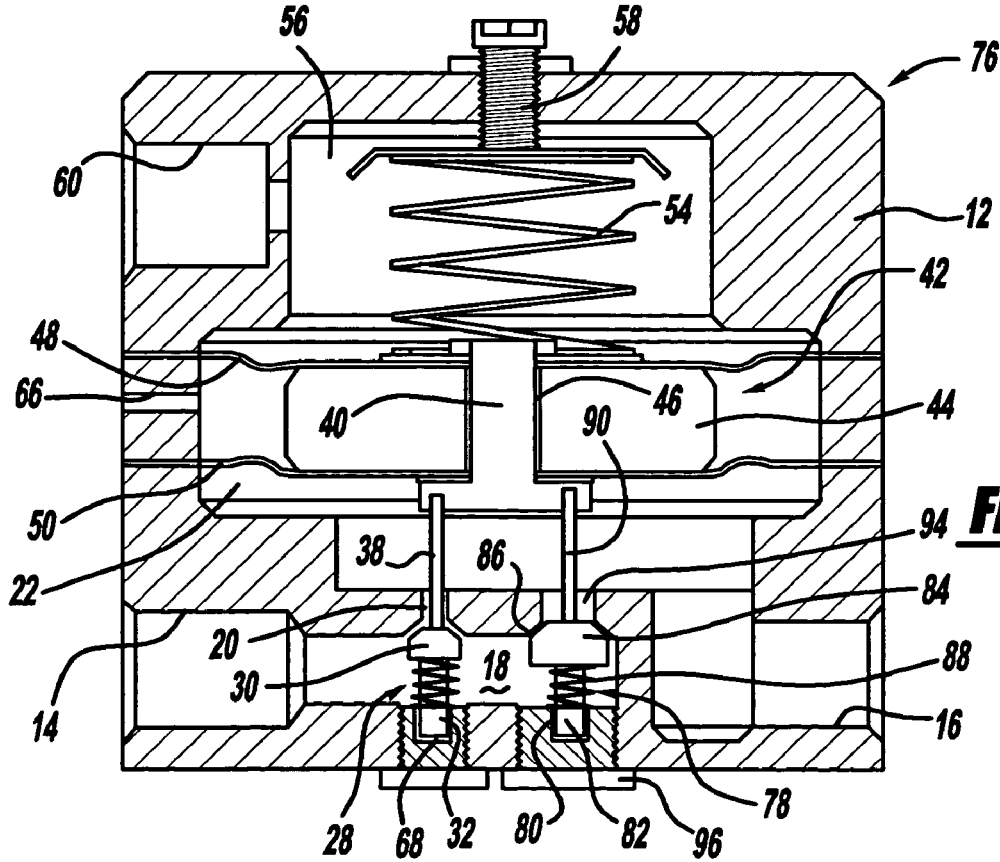
FIG. 3 is a cross-sectional view of the pressure regulator shown in FIG. 2 where the valves are positioned for relatively high flow rates.

In this design, the valve 78 includes a valve shaft 90 that extends through the orifice 94, and is slidably positioned within a gap 92 in the cylindrical member 40 instead of being rigidly fixed thereto. When a greater flow demand is required at the outlet port 16, the membrane assembly 42 is forced downward, against the bias of the spring 34 until the valve 28 is completely opened. As the valve 28 is being opened, the shaft 90 is sliding in the gap 92. Once the valve 28 is completely opened and the size of the gap 92 is reduced to zero, further flow demand at the outlet port 16 causes the membrane assembly 42 to move the valve 78 downward and open the orifice 94 in the same manner. The valve 28 will continue to move when the valve 78 moves, but the size of the orifice 20 prevents further flow therethrough. The size of the gap 92 is calibrated for the particular application. Therefore, the valve 28 controls the pressure regulation at low flow rates and the combination of the valves 28 and 78 control the pressure regulation at high flow rates. FIG. 3 is a cross-sectional view of the pressure regulator 76 where the valve 28 is completely opened and the valve 78 is beginning to open.

Figure 4:
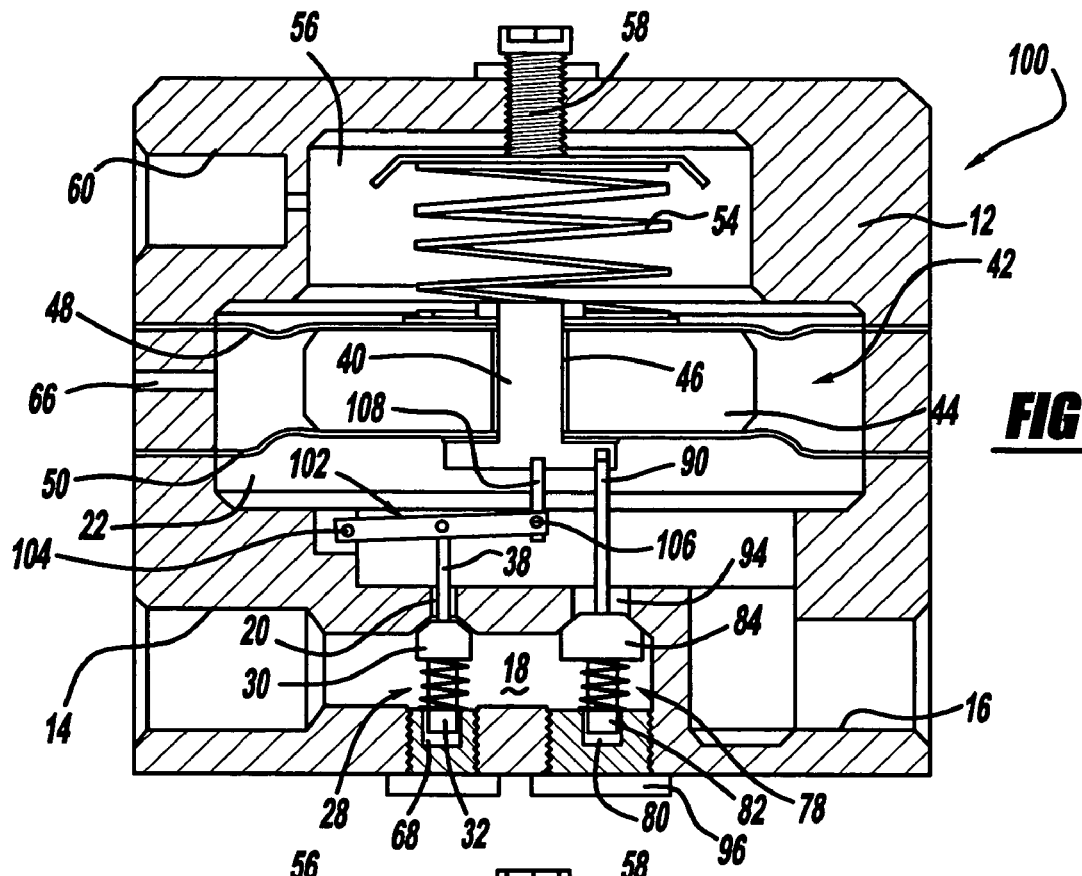
FIG. 4 is a cross-sectional view of a flow control pressure regulator including two valves, according to another embodiment of the present invention.
Figure 5:
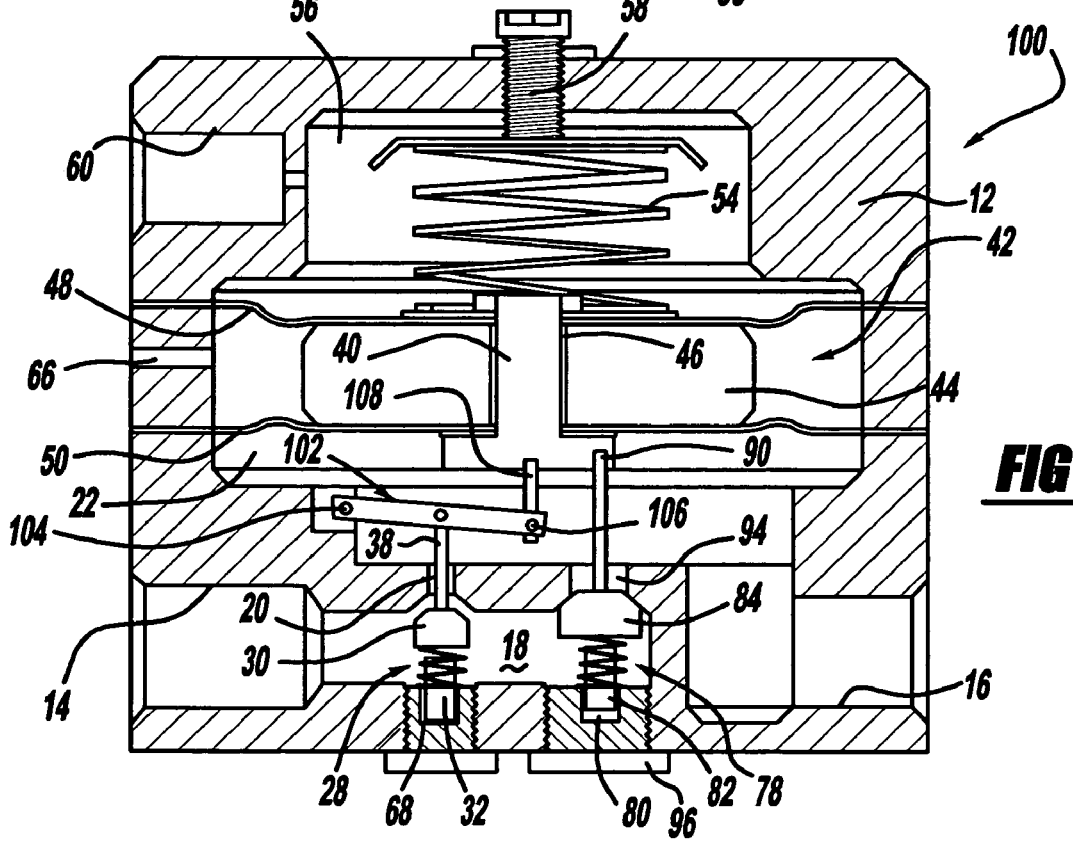
FIG. 5 is a cross-sectional view of the pressure regulator shown in FIG. 4 where the valves are positioned for relatively high flow rates.

FIG. 4 is a cross-sectional view of a flow control pressure regulator 100 similar to the pressure regulator 76, where like elements are identified by the same reference numeral. In this embodiment, a lever 102 is provided in combination with the valve 28 to provide a more accurate flow control at lower flow rates. One end 104 of the lever 102 is pivotably coupled to the body 12 and an opposite end 106 of the lever 102 is coupled to a shaft 108 that is rigidly coupled to the cylindrical member 40. The shaft 38 is rigidly secured to a center location of the lever 102. Therefore, as the membrane assembly 42 moves down towards the valves 28 and 78, the pivot action provided by the lever 102 reduces the distance that the valve 28 moves in response to the movement of the membrane assembly 42 to provide a greater flow control at lower flow rates. FIG. 5 is a cross-sectional view of the pressure regulator 100 where the lever 102 is in a position for maximum flow through the valve 28 and the valve 78 is beginning to open.

The embodiments of the invention discussed above include two valves for providing a desired turn-down ratio. However, as will be appreciated by those skilled in the art, it is within the scope of the present invention to provide additional valves in parallel beyond two to further increase the turn-down ratio of the pressure regulator. Further, the pressure regulators 76 and 100 are not limited to controlling the flow of hydrogen. In other applications, one of the membranes 48 or 50 can be eliminated for non-hazardous gasses. Also, the membrane assembly 42 can be replaced with a piston type configuration, as would also be well appreciated by those skilled in the art.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A flow control pressure regulator for controlling a gas flow, said pressure regulator comprising:
a body defining a first valve seat, a second valve seat, a first closable orifice and a second closable orifice;
a membrane assembly positioned within a membrane chamber in the body, said membrane assembly including at least one membrane defining a first side of the membrane chamber and a second side of the membrane chamber;
an inlet port formed in the body in fluid communication with the first side of the membrane chamber through the first and second orifices;
an outlet port formed in the body in fluid communication with the first side of the membrane chamber;
a first valve rigidly coupled to the membrane assembly, said first valve being positionable relative to the first valve seat upon movement of the membrane assembly so as to provide flow control between the inlet port and the outlet port through the first orifice; and
a second valve slidably coupled to the membrane assembly, said second valve being positionable relative to the second valve seat upon movement of the membrane assembly so as to further provide flow control between the inlet port and the outlet port through the second orifice, wherein the first valve is smaller than the second valve and the first closable orifice has a smaller diameter than the second closable orifice, and wherein the first valve provides flow control at low flow rates and the combination of the first valve and the second valve provides flow control at high flow rates, wherein the second valve is seated against the valve seat to close the second closable orifice at low flow rates.

2. The pressure regulator according to claim 1 wherein the second valve includes a valve shaft extending through the second orifice and positioned within a gap in the membrane assembly that prevents the second valve from moving until the membrane assembly has reached a predetermined position.

3. The pressure regulator according to claim 1 wherein the second side of the membrane chamber is in fluid communication with a reference port.

4. The pressure regulator according to claim 3 wherein the reference port is coupled to a cathode input of a fuel cell system.

5. The pressure regulator according to claim 3 wherein the reference port is coupled to ambient pressure.

6. The pressure regulator according to claim 1 wherein the at least one membrane is two membranes.

7. The pressure regulator according to claim 1 further comprising a lever member pivotally coupled to the body and coupled to the first valve and the membrane assembly, said lever member reducing the movement of the first valve in response to movement of the membrane assembly to provide a more accurate flow control.

8. The pressure regulator according to claim 1 wherein the pressure regulator controls the flow of hydrogen fuel to a fuel cell stack.

9. A flow control pressure regulator for providing hydrogen flow control to a fuel cell stack, said pressure regulator comprising:
a body;
an inlet port formed in the body;
an outlet port formed in the body in fluid communication with the inlet port;
a first orifice formed in the body between the inlet port and the outlet port, said first orifice including a first valve seat;
a second orifice formed in the body between the inlet port and the outlet port, said second orifice including a second valve seat;
a membrane assembly positioned within a membrane chamber in the body, said membrane assembly including at least one membrane defining a first side of the membrane chamber and a second side of the membrane chamber, said first side of the chamber being in fluid communication with the inlet port and the outlet port through the first orifice and the second orifice;
a first valve rigidly coupled to the membrane assembly, said first valve being positioned relative to the first valve seat upon movement from the membrane assembly so as to provide flow control between the inlet port and the outlet port through the first orifice; and
a second valve slidably coupled to the membrane assembly, said second valve being positioned relative to the second valve seat upon movement of the membrane assembly so as to further provide flow control between the inlet port and the outlet port through the second orifice, wherein the first valve and the first orifice are smaller than the second valve and the second orifice, and wherein the first valve provides flow control at low flow rates and the combination of the first valve and the second valve provide flow control at high flow rates, wherein the second valve includes a valve shaft extending through the second orifice and positioned within a gap in the membrane assembly that prevents the second valve from moving until the membrane assembly has reached a predetermined position.

10. The pressure regulator according to claim 9 wherein the second side of the membrane chamber is in fluid communication with a reference port.

11. The pressure regulator according to claim 10 wherein the reference port is coupled to a cathode input of a fuel cell system.

12. The pressure regulator according to claim 10 wherein the reference port is coupled to ambient pressure.

13. The pressure regulator according to claim 9 wherein the at least one membrane is two membranes.

14. The pressure regulator according to claim 9 further comprising a lever member pivotally coupled to the body and coupled to the first valve and the membrane assembly, said lever member reducing the movement of the first valve in response to movement of the membrane assembly to provide a more accurate flow control.

* * * * *